Nov. 1, 1966  F. E. SWAIN  3,282,558
ANNULAR SEALING MEANS
Filed Sept. 3, 1963  2 Sheets-Sheet 1

United States Patent Office 3,282,558
Patented Nov. 1, 1966

3,282,558
ANNULAR SEALING MEANS
Frank Edward Swain, "Hilltop" Kirkstone Close,
Glenfield Frith Drive, Leicester, England
Filed Sept. 3, 1963, Ser. No. 306,196
Claims priority, application Great Britain, Sept. 8, 1962,
34,469/62
2 Claims. (Cl. 251—174)

The invention relates to an annular sealing means between a valve member having a circular cross-section which is movable into and out of sealing engagement with a seating ring accommodated in an annular recess in the wall of a bore in a housing containing the valve member. The invention is particularly concerned with a valve including either a butterfly-type closure member, mounted for pivotal movement in the bore or a spherical or part-spherical valve member, having a throughway therein and rotatable into and out of a position in which the throughway is aligned with the bore.

Butterfly valves in which a rubber seating ring is permitted to move radially or to have its internal periphery contracted to provide a circumferential seal around the valve member are known; but have the disadvantage that the rubber is tightly engaged by the valve member and suffers scuffing or wear and may distort under fluid pressure sufficiently as to cause the valve member to jam or lock. An object of the invention is to provide a valve in which the valve member will form an effective seal without excessive loading of the seal in the radial direction and thereby to provide a valve in which the valve member will not lock even under extremely high fluid pressures and in which the seating ring will have a considerably longer life than hitherto. A further object is to provide a valve which will control fluid flow from either direction.

According to the invention, a valve includes a valve member having a circular cross-section, a seating ring accommodated in an annular recess in the wall of a bore in a housing containing the valve member, the seating ring being of such smaller axial thickness than the recess that the seating ring is movable axially in the recess to an extent dictated by axial movement of the valve member in the housing, as a result of fluid pressure applied to one or other side face of the valve member and the seating ring until the opposite side face has made contact with the adjacent radial face of the recess, and a sealing ring of a resiliently compressible material arranged co-axially in the recess between the peripheral wall thereof and the outer periphery of the seating ring, the combined radial thickness of the sealing ring and the seating ring being such that the sealing ring is deformed so as to centralise the seating ring around the valve member to form an annular seal therearound and also to engage the outer periphery of the seating ring and the peripheral wall of the recess and thereby to divide the recess into two co-axial annular chambers arranged side-by-side.

The sealing ring when deformed in this way will prevent pressurised fluid which has entered the clearance between the near axial end of the seating ring and the adjacent axial wall of the recess from flowing across the outer periphery of the seating ring and leaking between the opposite axial ends of the seating ring and the recess. Preferably the annular portion of the outer periphery of the seating ring lying between the seal therewith of the resiliently compressible sealing ring and the axial end of the latter adjacent the fluid pressure to be sealed, is of an area substantially equal to the area of an annular portion of the inner periphery of the seating ring lying between the seal it makes with the valve member and the same axial end which is adjacent the fluid pressure to be sealed, so that when the seating ring is displaced axially into engagement with the opposite side wall of the recess by the fluid pressure being sealed, the leakage of the pressurised fluid between the near axial ends of the seating ring and recess into the near-side annular chamber will exert a radially inward pressure on the annular portion of the outer periphery of the seating ring which forms a wall of that chamber, which will at least substantially balance the radially outward pressure of the fluid on the said annular portion of the inner periphery of the seating ring. In this way the seating ring will not be compressed in the radial direction and thus the torque required to open the valve member will be lower than in known butterfly valves and the life of the seating ring will be longer than hitherto.

Also the radial plane of the seal formed by the resiliently compressible sealing ring between the peripheral wall of the recess and the outer periphery of the seating ring may be coincident with the median plane of the seal the inner periphery of the latter makes with the valve member, thereby enabling the valve member to be equally effective to pressure applied from either side thereof.

Preferably the resiliently compressible sealing ring is of rubber or elastomeric material and has a circular cross-section, but in the case where high temperatures have to be withstood use can be made instead of other material, for example two refractory rings (e.g., of an asbestos compound) of laterally directed U-section placed back to back. The seating ring may be made of rubber or elastomeric material, metal or any other suitable material, dependent upon the temperature, pressure and nature of the fluid to be controlled by the valve.

By way of example, a butterfly valve according to the invention will now be described with reference to the accompanying drawings, in which.

Figure 1:
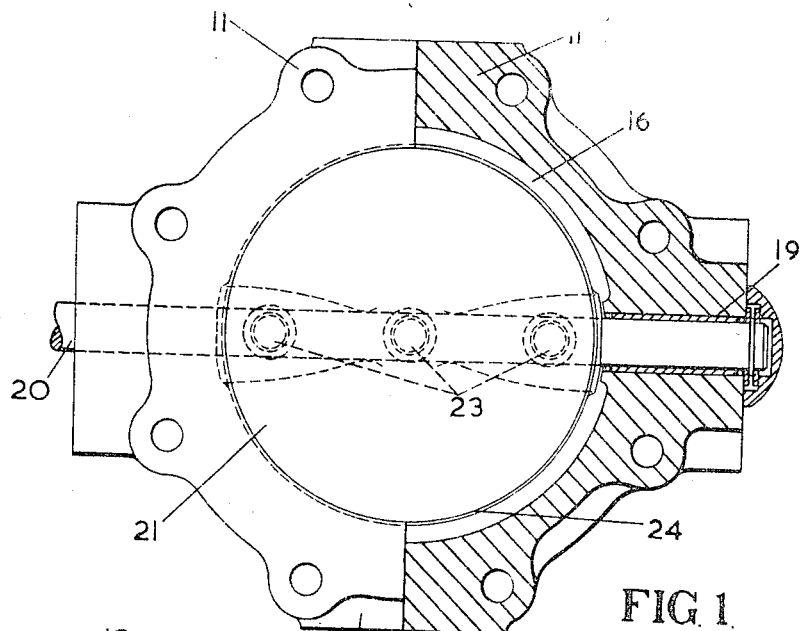
FIGURE 1 is a part end view and part cross-section of the valve, showing the valve member in its closed position and not in section.
Figure 2:
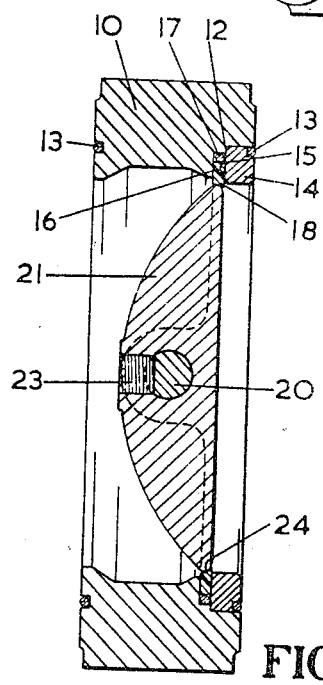
FIGURE 2 is an axial section through the valve showing the valve member in its closed position.

Referring to FIGURES 1 and 2, the valve body is shown at 10 and is provided with a flange 11, for bolting up to similar flanges of pipes or other members (not shown) in a supply line for a fluid under pressure, seals for the joints being indicated in FIGURE 2 at 13. A retaining ring 14 (see FIGURE 2) is a push fit up to an annular shoulder 12 in the valve body, thereby to space the inner end face 15 of the retaining ring 14 from an annular surface 16 in the valve body to form the side walls of the aforesaid annular recess. Within this annular recess there is a rubber sealing ring 17 of circular cross-section, and a rubber seating ring 18 positioned within the ring 17. The ring 18 has an axial thickness slightly smaller than the axial width of the recess to provide for axial movement of the seating ring 18 and to allow the latter to move in a radial direction (e.g., for centering purposes or to accommodate thermal expansion of the valve member). The axial clearance between the seating ring 18 and the recess is determined by the diametral clearance of the shaft 20 in its bearings and sometimes by the axial deflection of the valve member under fluid loads. The seating ring 18 may contain a metal reinforcing ring embedded in it. This is not shown and may be continuous or circumferentially split.

At diametrically opposite positions the body 10 is provided with bearings 19 (of which one is shown in FIGURE 1) to receive the ends of a transverse shaft 20, carrying a butterfly valve member 21 of lenticular form. The shaft 20 is accommodated in a diametrical bore of the valve member and is locked in position by set-screws 23. The valve member 21 has a rim 24 of which the edge has a convex cross-section.

It will be observed that the rim 24 is offset axially of the bore in the valve body 10 from the axis of shaft 20, and in the closed position of the valve the inner periphery of seating ring 18 engages the rim 24 to effect an annular seal.

Figure 3:
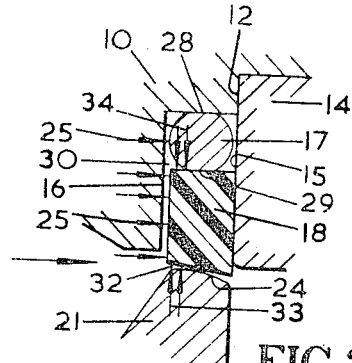
FIGURE 3 is a part of FIGURE 2 to a considerably larger scale and shows the fluid pressure applied from the left-hand side of the valve member.

The fluid to be sealed is at the left-hand side of the valve member 21 in FIGURE 2 and reference to FIGURE 3 shows the action of the seal. The pressure of the fluid acts on the left-hand end face of the seating ring 18 and the sealing ring 17 adjacent the radially inner ends thereof and pushes the rings 17 and 18 in unison axially against the wall 15 of the recess, causing an axial clearance to be provided at the pressure side of the recess and thereby admitting the pressurised fluid to flow into that side of the recess as indicated by the arrows 25. This results in a seal being formed adjacent the wall 15 of the recess. The inner and outer diameters of the sealing ring 17 are such that when the latter is in position between the bottom of the recess and the seating ring the sealing ring is deformed to establish a seal at 28 with the peripheral wall, i.e., the bottom of the recess, and a seal at 29 with the outer periphery of seating ring 18 in which condition the sealing ring 17 has an axial thickness approximately equal to the axial thickness of the seating ring 18. It will therefore be seen that a very effective shut-off seal is provided to prevent passage of the pressurised fluid to the right-hand side of the valve member. It should be emphasized that apart from a very small constraining force imparted by the sealing ring 17, the only force acting on the seating ring 18 is that due to fluid pressure and that therefore the seating ring 18 is not subjected to mechanically applied forces, as in previous valves.

In addition to this it will be observed that the action of the sealing ring 17 in effecting the seals at 28 and 29 reduces the annular area of the outer periphery of the seating ring 18, which is subjected to the pressure in the chamber 30 formed by the sealing ring 17 in the bottom of the recess. This reduced area, gives rise to a smaller radially inward compression of the seating ring 18 on to the rim 24 than if sealing ring 17 were absent, and thus reduces scuffing of seating ring 18 when the rim 24 moves relatively to it during opening and closing of the valve member. This reduced radially inward compression, indicated by arrows 34, is at least partially opposed by the fluid pressure acting radially outwardly on the annular portion 32 of the inner periphery of the seating ring 18 as indicated by arrows 33 and thus the radial loading of the sealing ring 17 is small or is avoided. It is arranged for the median planes of the seals effected at 28 and 29 to be aligned with the median plane of the seal between the rim 24 and the inner periphery of the seating ring 18, this alignment being maintained as the rings 17 and 18 will move axially in unison in the recess on application of fluid to one or other axial end of the valve.

Figure 4:
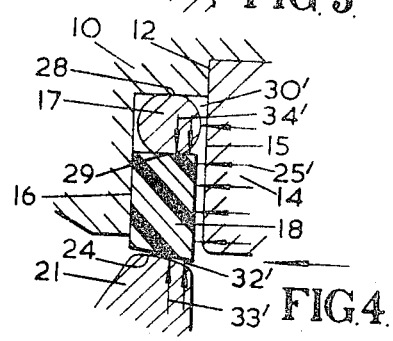
FIGURE 4 is a view similar to FIGURE 3; but showing the fluid pressure applied from the right-hand side of the valve member.

FIGURE 4 shows the condition of the seating ring 18 and the sealing ring 17, when the pressurised fluid is applied from the right-hand side of the valve, like reference numerals being used for the same parts in both figures and being modified by the addition of a dash for items in FIGURE 4 corresponding to those in FIGURE 3. It will therefore be seen that the valve will function as efficiently as when the fluid pressure is applied from the left-hand side of the valve member and thus the valve can be used either way round.

Figure 5:
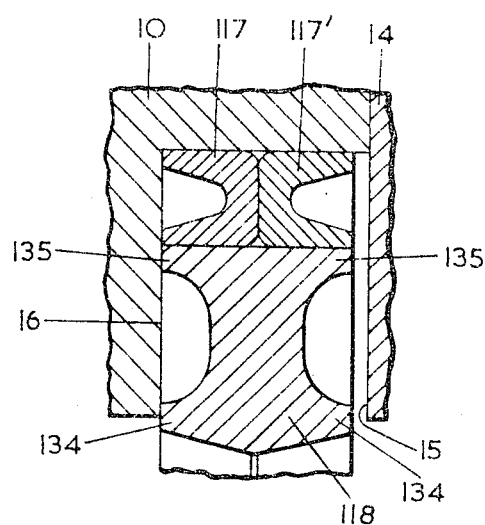
FIGURE 5 is a similar view to FIGURE 4; but showing modified forms of the seating and sealing rings.

The rubber rings 17 and 18 can only be used when the temperature and nature of the fluid to be withstood is appropriate. In other cases other materials are used. For example, where higher operating temperatures are required, the construction shown in FIGURE 5 can be used instead. In that figure the seating ring 118 is of metal and has an annular groove in each end face so as to provide it with radially inner and outer lands 134 and 135; and instead of the rubber ring 17, use is made of two rings 117, 117' of lateral U cross-section placed back to back, these rings being composed of a refractory material such as an asbestos compound. In this case the pressurised fluid acts between the flanges of the ring 117 or 117' to move the rings 117, 117' and 118 in unison axially in the recess and to establish the seals at the bottom of the recess and the seating ring 118 and acts on the radially outer surface of the radially inner flange of the ring 117 or 117' to apply a radial inward fluid force on the seating ring 118 to be at least partially opposed by a fluid force acting on radially inner annular face of the land 134 at the same axial end of the ring 118. The material of the valve member 21 (not shown) and ring 118 are made similar to ensure identical coefficients of expansion, and the periphery of the valve member can be coated with stellite to avoid like material contact.

In the foregoing description the term "fluid pressure" has been employed. This is intended to mean not only gaseous or liquid pressures; but also the pressure resulting from the flow of powders, as the valve shown in FIGURES 1 to 4 has been used successfully with such powders as carbon black, dry cement, cereals and other powdered foodstuffs.

Although a butterfly valve has been described in the foregoing example, the invention could be applied to a valve having a spherical or part-spherical valve member, as mentioned hereinbefore.

What I claim as my invention and desire to secure by Letters Patent of the United States is:

1. A valve including a housing having a bore therein and an annular recess in the wall of the bore, a valve member having a circular cross-section and positioned in said bore, a seating ring capable of making sealing engagement with the periphery of the valve member and accommodated in said annular recess, the seating ring being of smaller axial thickness than the width of said recess whereby the seating ring is movable axially in the recess to an extent dictated by axial movement of said valve member in said housing, as a result of fluid pressure applied to one or other end face of said seating ring until the opposite end face has made contact with the adjacent radial face of said recess, and a sealing ring of a resiliently compressible material positioned co-axially in said recess between the peripheral wall thereof and the outer periphery of said seating ring, said sealing ring having a radial cross-section of substantially circular shape, before it has been placed in the recess co-axially around said seating ring, the diameter of said circular cross-section being greater than the radial distance between the outer periphery of said seating ring and the peripheral wall of the recess, whereby when the sealing ring has been located in the recess co-axially around said seating ring, said sealing ring is radially deformed into non-circular shape thereby to make sealing engagement with the peripheral wall of the recess and with the outer periphery of said seating ring, the median planes of the seals effected between the sealing ring and the peripheral wall of the recess and between the sealing ring and the outer periphery of the seating ring being aligned with the median plane of the seal where the valve member engages the radially inner face of said seating ring, when the valve member is closed, the axial thickness of said sealing ring when so deformed also being less than the axial width of the recess and approximately equal to the axial thicknes of the seating ring, whereby said sealing ring is movable in unison with said seating ring to permit fluid to flow between the adjacent end faces of said seating and sealing rings and the radial face of said recess at the upstream side of said valve member and to prevent fluid flow between the peripheral wall of the recess and said sealing ring and between said sealing and seating rings to the downstream end faces of said rings.

2. A valve as claimed in claim 1, wherein the axial thickness of the sealing ring in its non-deformed state is only slightly less than the axial thickness of the seating ring in its non-deformed state.

References Cited by the Examiner

UNITED STATES PATENTS

| | | | |
|---|---|---|---|
| Re. 23,613 | 1/1953 | Danks | 251—173 |
| 2,889,134 | 6/1959 | Bryant | 251—172 |
| 3,027,133 | 3/1962 | Anderson | 251—173 |
| 3,057,374 | 10/1962 | Gondek | 251—172 |
| 3,085,784 | 4/1963 | Dumm | 251—358 X |

FOREIGN PATENTS

| | | |
|---|---|---|
| 903,802 | 8/1962 | Great Britain. |
| 601,397 | 6/1960 | Italy. |
| 111,911 | 7/1962 | Pakistan. |

WILLIAM F. O'DEA, *Primary Examiner.*

ISADOR WEIL, *Examiner.*

H. WEAKLEY, *Assistant Examiner.*